United States Patent [19]

Azarnia

[11] Patent Number: 5,393,806
[45] Date of Patent: Feb. 28, 1995

[54] EPOXIDE SYSTEM CURING AGENTS

[75] Inventor: Farah D. Azarnia, Baton Rouge, La.

[73] Assignee: Albemarle Corporation, Richmond, Va.

[21] Appl. No.: 813,675

[22] Filed: Dec. 26, 1991

[51] Int. Cl.$^6$ .............................................. C08L 63/02
[52] U.S. Cl. ................................. 523/400; 523/468; 264/137; 264/236; 264/347; 525/423; 528/91; 528/99; 528/103; 528/124; 528/407
[58] Field of Search ................ 264/137, 236, 347; 525/423; 523/400, 468; 528/91, 99, 103, 124, 407

[56] References Cited

U.S. PATENT DOCUMENTS

| | | | |
|---|---|---|---|
| 4,366,108 | 12/1983 | Urech et al. | 528/124 |
| 4,447,586 | 5/1984 | Shimp | 525/504 |
| 4,977,215 | 12/1990 | Gardner et al. | 525/122 |
| 4,977,218 | 12/1990 | Gardner et al. | 525/329.3 |
| 5,087,657 | 2/1992 | Qureshi et al. | 524/508 |

OTHER PUBLICATIONS

*Encyclopedia of Chemical Technology*, Third Edition, vol. 9, pp. 267, 278–280 and 288.
Wiggins, P. L., "Curing Acceleration of a Hindered Aromatic Diamine-Epoxy System", *World of Composites–Focus '86*, 41st Annual Conference, Reinforced Plastics/Composites Institute, The Society of Plastics Industry, Inc., Jan. 27–31, '86, Session 5-A, p. 106.

*Primary Examiner*—John Kight, III
*Assistant Examiner*—Richard Jones
*Attorney, Agent, or Firm*—Richard J. Hammond

[57] ABSTRACT

An improved liquid matrix system for producing fibre-reinforced plastic components is disclosed. The system comprises (i) a liquid diglycidyl ether of a halogenated bisphenol or a mixture of liquid polyglycidyl ether bisphenols at least one of which being a polyglycidyl ether halogenated bisphenol; and (ii) a curing agent that is a sterically hindered aromatic diamine containing two primary amino groups attached to the carbon atoms in the aromatic nucleus, said carbon atoms not adjacent to each other, and at least one $C_1$ to $C_6$ linear or branched alkyl or thioalkyl substituent; the improvement comprising adding to said system a curing accelerator composition containing a mixture of a boron halide and an imidazole unsubstituted or substituted with at least one $C_1$ to $C_6$ linear or branched alkyl or $C_6$ to $C_{10}$ aryl.

5 Claims, No Drawings

EPOXIDE SYSTEM CURING AGENTS

FIELD OF THE INVENTION

Epoxide resin/curing agent systems which can be used for producing fibre-reinforced plastics, such as laminates, are known. It is of advantage for impregnating the fibres when these systems are low viscosity liquid with long pot lives. This invention relates to epoxy/aromatic amine curing agent formulations with acceptable pot lives, degrees of reactivity and glass transition temperatures.

BACKGROUND OF THE INVENTION

Aliphatic and aromatic amines are well known curing agents and are discussed in detail in many technical publications, e.g., "*Epoxy Resins*" by Lee and Neville (1957). Typical aromatic amines, used as epoxy curing agents, are metaphenylene diamine, methylene dianiline and diaminodiphenyl sulfone. Such amines are solid compounds which must be heated when mixed with polyepoxide resins. Curing temperatures and curing times are relatively high and long, but can be reduced somewhat with an accelerator, e.g., phenolic compound, aliphatic amine, imidazoles, or boron trifluoride amine complex.

Typical aliphatic amines used with the polyepoxide resins are diethylenetriamine, triethylenetetraamine and dicyandiamide. The former two react readily with epoxy resins at room temperature and, therefore, do not offer long pot lives to the formulation. Dicyandiamide is a high melting solid amine with low solubility in many solvents.

U.S. Pat. No. 4,366,108 describes curable compositions made from a liquid epoxy resin, a hindered aromatic amine, namely diethyltoluenediamine, and a curing accelerator. Typical accelerators are 1-methylimidazole, phenols, salicylic acid and boron-fluoroamine complexes, such as BF3-acetoacetanilide, BF3-aniline complexes or BF3-monoethylamine.

A recent publication, Wiggins, "*Curing Acceleration of a Hindered Aromatic Diamine-Epoxy System*", 41st Annual Conference, Reinforced Plastics/Composites Institute, The Society of Plastics Industry, Inc., Jan. 27-31, 1986, Session 5-A, also discusses the use of various accelerators with hindered aromatic amines as curing compositions for epoxide systems. While some of the accelerators provided satisfactory gel times in these systems, Tg and/or shelf stability suffered from such materials.

The invention relates, therefore, to a liquid matrix system, based on a mixture of epoxide resin and an amine curing agent for the epoxide resin, for producing fibre-reinforced plastics components.

OBJECTS OF THE INVENTION

It is the object of this invention to utilize hindered aromatic amine curing agents for polyepoxide resins. In particular, it is an object of this invention to provide polyepoxide resin curing agents made from hindered aromatic amines accelerated with a mixture of curing agent accelerators.

It is an additional object of the present invention to provide halogenated polyepoxide resins or mixtures of halogenated and non-halogenated polyepoxides that are cured with hindered aromatic diamines used in combination with curing agent accelerators that are a mixture of a boron halide and substituted or unsubstituted imidazole.

DESCRIPTION OF THE PREFERRED EMBODIMENTS

The curing agent compositions of this invention are made from (1) a sterically hindered aromatic diamine containing two primary amine groups attached directly to carbon atoms in the aromatic nucleus wherein the carbon atoms are not adjacent to each other and wherein each position ortho to each amine group contains an alkyl substituent or alkylthio having one to six carbon atoms and curing agent accelerators.

The hindered aromatic diamine curing agents are liquid and low melting solids and are much easier to incorporate into polyepoxide resin than conventional aromatic polyamines. These hindered aromatic diamines are relatively non-staining as compared to the conventional aromatic polyamines.

The hindered aromatic diamines useful in this invention are sterically hindered aromatic diamines containing two primary amine groups. The two primary amine groups are attached directly to non-adjacent carbon atoms in the aromatic nucleus. Each position ortho to each amine group contains an alkyl or alkylthio substituent having one to six carbon atoms. Preferred hindered amines are those wherein at least one position ortho to each amine group contains a methyl or methylthio substituent. Particularly preferred hindered amines are those wherein at least 3 of the positions ortho to the amine groups contain $C_1$ to $C_3$ alkyl substituents. These hindered aromatic diamines can be mononuclear or dinuclear. If dinuclear, one primary amine group is attached to each aromatic nucleus. Examples of the alkyl-substituted hindered aromatic diamines are diethyltoluenediamine (a mixture of 1-methyl-3,5-diethyl-2,4-diaminobenzene and 1-methyl-3,5-diethyl-2,6-diaminobenzene), 1,3,5-triethyl-2,4-diaminobenzene, 1-ethyl-3,5-diisopropyl-2,6-diaminobenzene, 1,3,4,6-tetramethyl-2,5-diaminobenzene, 1,4-dimethyl-3,6-diethyl-2,5-diaminobenzene, methylenebis(2,6-diisopropylaniline), methylenebis(2,6-diethylaniline), methylenebis(2-methyl-6-ethylaniline), and the like. The preferred hindered aromatic diamine is diethyltoluenediamine.

Examples of the alkylthio-substituted hindered aromatic diamines are dimethylthiotoluenediamine (a mixture of 1-methyl3,5-dimethylthio-2,4-diaminotoluene and 1-methyl-3,5-dimethylthio-2,6-diaminotoluene), diethylthiotoluenediamine (a mixture of 1-methyl-3,5-diethylthio-2,4-diaminobenzene and 1-methyl-3,5-diethylthio-2,6-diaminobenzene), 1,3,5-triethylthio-2,4-diaminobenzene, 1-ethylthio-3,5-diisopropylthio-2,6-diaminobenzene, 1,3,4,6-tetramethylthio-2,5-diaminobenzene, 1,4-dimethyl-3,6-diethylthio-2,5-diaminobenzene, methylenebis(2,6-diisopropylthioaniline), methylenebis(2,6-diethylthioaniline), methylenebis(2-methyl-6-ethylthioaniline), and the like.

The curing agent accelerator is a mixture of a boron halide (i.e., boron trifluoride, boron trichloride, or boron tribromide) and substituted or unsubstituted imidazole. The preferred boron halide is boron trifluoride, particularly boron trifluoride complexed with appropriate organic compounds such as aromatic or aliphatic amines (aniline, monoethylamine, benzylamine, piperidine, etc.). The preferred imidazole is either unsubstituted imidazole or imidazole substituted with at least one $C_1$ to $C_3$ linear or branched alkyl group or phenyl. Particularly preferred are monosubstituted imidazoles at positions 1 or 2 or disubstituted imidazoles at positions 2 and 4 with methyl and/or ethyl.

It should be noted that the curing agent accelerator mixture can use salicylic acid in place of the boron halide.

The acceleration mixture utilizes from about 5 to about 95% by weight of the boron halide and about 95 to 5% by weight of the imidazole compound (a ratio of from about 0.05 to 0.95 to about 0.95 to about 0.05 boron halide to imidazole). Preferably, the ratio is 50:50 to 80:20, imidazole:boron halide.

About 0.1 to 15% by weight (preferably about 5-10% by weight) based on the total weight of curing agent and curing agent accelerator mixture is used for the systems of the present invention.

The polyepoxide resins useful in this invention are polyepoxides having more than one epoxy group per molecule, said epoxy group being a terminal epoxy group of the 1,2 or vicinal type. These polyepoxide resins can be liquid or solid in nature having viscosities as low as about 60 cps at 25° C. and melting points as high as 80° C. The useful polyepoxide resins are based on aromatic phenols, aliphatic polyols, polycarboxylic acids, aromatic or aliphatic polyamines and mixtures of these.

Among the aromatic phenolic polyepoxides useful in this invention are glycidyl polyethers of polyhydric phenols. Such polyepoxides are generally derived from a polyhydric phenol and an epihalohydrin and have epoxide equivalent weights of about 110 to about 500. Examples of the epihalohydrins are epichlorohydrin, epibromohydrin and epiiodohydrin, with epichlorohydrin being preferred. The polyhydric phenols are exemplified by resorcinol, hydroquinone, p,p'-dihydroxydiphenyl methane, p,p'-dihydroxydiphenyl propane (or Bisphenol A as it is commonly called), p,p'-dihydroxybenzophenone, p,p'-dihydroxydiphenyl, p,p'-dihydroxydiphenyl ethane, bis(2-hydroxynaphthyl)methane, 1,5-dihydroxynaphthalene, phenolic novolacs and the like. These polyepoxide resins are well known in the art and are made by reacting the epihalohydrin in an amount at least equal to the phenolic hydrogen atoms, and, most preferably, in excess. Higher molecular weight polyepoxide resins are made by reacting lower molecular weight resins with additional dihydric phenol. The preferred polyepoxide resins are those based on Bisphenol A.

A second type of polyepoxide which is useful in this invention is a glycidyl polyester prepared by reacting an epihalohydrin, such as epichlorohydrin, with an aromatic or aliphatic polycarboxylic acid, such as ortho, meta, or para phthalic acid, tetrahydrophthalic acid, hexahydrophthalic acid, adipic acid and the like. Such polyglycidyl esters and their preparation are described in U.S. Pat. No. 3,859,314, which is hereby incorporated by reference.

A third type of polyepoxide resin useful in this invention is a glycidyl amine made by reacting a polyamine with an epihalohydrin. Examples of such amines include aniline, ortho, meta, and para toluidine, methylenedianiline, metaxylylenediamine, 1,3-bis(aminomethyl)cyclohexane and the like. Such glycidyl amines and their preparation are described in U.S. Pat. Nos. 2,951,822 and 3,310,528 which are hereby incorporated by reference. Polyepoxides made from aminophenols are also useful in this invention. Such polyepoxides are described in U.S. Pat. No. 2,951,825 which also is incorporated by reference.

Additional polyepoxides useful in this invention are those polyepoxides made from an epihalohydrin and an aliphatic polyol, e.g., hydrogenated Bisphenol A, ethylene glycol, butanediol, trimethylolethane, trimethylolpropane, pentaerythritol and the like. Such polyepoxides are described in U.S. Pat. No. 3,033,803 which is hereby incorporated by reference.

In preparing the cured compositions of this invention, the hindered aromatic amine curing agents and the polyepoxide resins are reacted in the equivalent ratios of about 0.5 to about 1.5 amine hydrogen atoms to one epoxy group and, preferably, about 0.6 to about 1.2 amine hydrogen atoms per epoxy group. The amount of accelerator blend is typically in the range of about 0.1-3, preferably about 0.5-1.5 parts per hundred parts by weight of epoxy resin.

The blend of curing agent and polyepoxide resin must be cured at elevated temperatures, e.g., 50° C. up to 250° C. for a time sufficient to obtain a cured composition. Normally, the blends are heated at 50°-125° C. until the system gels and are cured for about one hour at 170°-180° C.

Depending on the specific end uses, the curable compositions of this invention can contain non-alkaline fillers, fibers, thixotropes and pigments. Solvents can be used in some applications, particularly in fiber reinforced prepregs used in the manufacture of laminates and composites.

The matrix system according to the invention is preferably applied without solvent. It can however contain, relative to the total weight of the matrix system, up to 40% of solvents, such as toluene, ketones, glycol ethers, etc., and up to 5% of an adhesion promoter and up to 2% of a dye.

The matrix according to the invention is used to produce fibre-reinforced plastics. It is thus possible, using known impregnating methods, to impregnate and cure fibre materials such as filaments, rovings, mats or fabrics. Advantageous factors in the procedure are the low viscosity at the working temperatures, the long pot life and the short gelling and curing times. The cured components have high glass transition temperatures.

The improved compositions of the present invention have Tg of about 115°-135° C. and show gel times of 3 to 5 minutes at 171° C. Surprisingly, the shelf-life of the mixture is very good, achieving satisfactory performance after up to about 7 days.

EXAMPLES

The following examples are given to illustrate the invention and are not intended as a limitation thereof.

EXAMPLE I (TABLE I)

$BF_3 \cdot MEA$ was dissolved in 1-methoxy-2-propanol. Brominated epoxy resin solution EPON 1123A80 (~80% non-volatile, 426 epoxy equivalent weight, 18-20.5% Br content) was weighed into a jar and diethyltoluenediamine (DETDA) was added. The catalyst solution was then added and the mixture blended. The mixture was allowed to age at room temperature for one hour. Gel time was determined at 171° C. to be greater than 10 minutes which was unacceptable (expected 2-5 minutes).

EXAMPLE II (TABLE I)

2-MI and $BF_3 \cdot MEA$ were dissolved in 1-methoxy-2-propanol. Diethyltoluenediamine (DETDA) was added and mixed to dissolve. EPON 1123A80 was added and mixed for ~45-60 minutes to achieve a homogenous solution. Gel time was determined at 171° C. The gelled sample (from gel plate) was cured in a 177° C. oven for 70 minutes. The glass transition temperature was determined on the cured sample using Differential Scanning Calorimeter. The room temperature stability of the varnish was determined by measuring viscosity and gel time over a one week period (Table II).

EXAMPLE III (TABLE I)

Same as Example II except that 2,4-EMI was used in place of the mixture of 2-MI and BF$_3$·MEA.

EXAMPLE IV (TABLE I)

Same as Example II except that a blend of 2,4-EMI, BF$_3$·MEA and DETDA was dissolved in the solvent and then the epoxy resin was added and mixed for 45-60 minutes.

EXAMPLE VII (TABLE I)

Same as Example IV except that 2-MI was the sole catalyst.

The data in Table I on the Example I formulation suggest that boron halide, a typical epoxy/aromatic amine curing agent catalyst, does not enhance the reactivity of the aromatic amine to an acceptable level and results in unacceptably long gel time. In Examples III and VII, the catalysts used were imidazoles. These varnishes exhibited acceptable gel times and glass transition temperatures. However, their viscosities increased by ~2-300% over a one week period and their gel times decreased by 30-40%. The formulations containing a blend of an imidazole and an acid catalyst such as boron halide or salicylic acid gave the best overall results. They exhibited acceptable gel times and glass transition temperatures as well as slower viscosity build-ups and gel time decreases.

TABLE I

| COMPONENTS | EXAMPLE I | EXAMPLE II | EXAMPLE III | EXAMPLE IV | EXAMPLE V | EXAMPLE VI | EXAMPLE VII |
|---|---|---|---|---|---|---|---|
| FORMULATIONS | | | | | | | |
| 2-MI, part | — | 0.97 | — | — | 0.72 | 0.72 | 0.55 |
| 2,4-EMI, part | — | — | 1.37 | 1.45 | — | — | — |
| BF$_3$·MEA, part | 0.16 | 0.48 | — | 0.48 | — | — | — |
| Salicylic Acid, part | — | — | — | — | — | 1.45 | — |
| Mn (acac)$_3$, part | — | — | — | — | 0.72 | — | — |
| DETDA, part (eq.) | 1.77 (1.05) | 9.08 (0.6) | 8.57 (0.6) | 9.09 (0.6) | 9.09 (0.6) | 9.09 (0.6) | 9.09 (0.6) |
| 1-methoxy-2-propanol, part | 8.09 | 69.12 | 65.28 | 68.54 | 68.22 | 68.7 | 67.62 |
| EPON 1123A80, part | 20.0 | 180.0 | 170.0 | 180.2 | 180.1 | 180.0 | 180.0 |
| GEL TIME AT 171° C. | >10' | 3'40" | 3'00" | 4'20" | 3'05" | 3'20" | 4'10" |
| GLASS TRANSITION TEMPERATURE, °C. (DSC) | — | 130 | 130 | 135 | 127 | 126 | 124-130 |

2-MI 2-methylimidazole
BF$_3$·MEA boron trifluoride monoethylamine complex
2,4-EMI 2-ethyl-4-methylimidazole
Mn(acac)$_3$ Manganic acetylacetonate
DETDA diethyltoluenediamine
EPON 1123A80 Brominated bisphenol A-type epoxy solution in acetone (~80% non-volatile, ~426 weight per epoxy, 18-20.5% Br content)

TABLE II

| | EXAMPLE II | EXAMPLE III | EXAMPLE IV | EXAMPLE V | EXAMPLE VI | EXAMPLE VII |
|---|---|---|---|---|---|---|
| STABILITY STUDY | | | | | | |
| KINEMATIC VISCOSITY @ 25° C. (cST/% increase) | | | | | | |
| Initial varnish | 91 | 89 | 87 | 86 | 103 | 84 |
| 1-day old | 110/21 | 103/16 | 103/18 | 99/15 | 114/11 | 95/13 |
| 2-day old | 124/36 | 115/29 | 117/34 | 111/29 | 126/22 | 109/30 |
| 4-day old | 155/70 | 161/81 | 142/63 | 145/69 | 145/41 | 150/79 |
| 7-day old | 221/143 | 265/198 | 177/103 | 210/144 | 178/73 | 348/314 |
| 9-week old | viscous liquid (flows) | hard gel | | | | |
| GEL TIME @ 340° F. (seconds/% decrease) | | | | | | |
| Initial Varnish | 220 | 180 | 260 | 185 | 200 | 250 |
| 1-day old | 215/2 | 175/3 | 260/0 | 170/8 | 180/10 | 220/12 |
| 2-day old | 218/1 | 165/8 | 245/6 | 160/14 | 180/10 | 195/22 |
| 4-day old | 210/5 | 140/22 | 235/10 | 150/19 | 175/13 | 185/26 |
| 7-day old | 205/7 | 120/33 | 235/10 | 135/27 | 165/18 | 150/40 |

EXAMPLE V (TABLE I)

Same as Example IV except that a blend of 2-MI and Mn(acetylacetonate)$_3$ was used as the catalyst mixture.

EXAMPLE VI (TABLE I)

Same as Example IV except that a blend of 2-MI and salicylic acid was used as the catalyst mixture.

I claim:

1. In a liquid matrix system for producing fibre-reinforced plastic components, said system comprising: (i) a liquid diglycidyl ether of a halogenated bisphenol or a mixture of liquid polyglycidyl ether bisphenols at least one of which being a polyglycidyl ether halogenated bisphenol; and (ii) a curing agent or a mixture of curing agents that are sterically hindered aromatic diamines containing two primary amino groups attached to the carbon atoms in the aromatic nucleus, said carbon atoms not adjacent to each other, and at least one $C_1$ to $C_6$ linear or branched alkyl or thioalkyl substituent; the improvement comprising adding to said system a curing accelerator composition containing a mixture of a boron halide and an imidazole unsubstituted or substituted with at least one $C_1$ to $C_6$ linear or branched alkyl or $C_6$ to $C_{10}$ aryl.

2. The liquid matrix system according to claim 1 wherein the ratio of said boron halide to said imidazole is from about 0.95 to 0.05 to about 0.05 to 0.95.

3. The liquid matrix system according to claim 2 wherein said boron halide is boron trifluoride complexed with an organic amine.

4. The liquid matrix composition according to claim 2 wherein said imidazole is substituted with at least one $C_1$ to $C_6$ linear or branched alkyl.

5. The liquid matrix composition according to claim 3 wherein said imidazole is substituted with at least one $C_1$ to $C_6$ linear or branched alkyl.

* * * * *